US011880616B2

(12) United States Patent
Tanaka

(10) Patent No.: US 11,880,616 B2
(45) Date of Patent: Jan. 23, 2024

(54) INFORMATION PROCESSING SYSTEM, CONTROL METHOD THEREFOR, AND COMPUTER-READABLE STORAGE MEDIUM

(71) Applicant: Canon Kabushiki Kaisha, Tokyo (JP)

(72) Inventor: Yuya Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/299,131

(22) Filed: Apr. 12, 2023

(65) Prior Publication Data

US 2023/0384995 A1 Nov. 30, 2023

(30) Foreign Application Priority Data

May 30, 2022 (JP) ................. 2022-087878

(51) Int. Cl.
*G06F 3/12* (2006.01)
(52) U.S. Cl.
CPC .......... *G06F 3/1231* (2013.01); *G06F 3/1204* (2013.01); *G06F 3/12* (2013.01); *G06F 3/1288* (2013.01)
(58) Field of Classification Search
None
See application file for complete search history.

(56) References Cited

U.S. PATENT DOCUMENTS

2018/0241833 A1\* 8/2018 Hachiya ............... H04L 67/146
2020/0064766 A1\* 2/2020 Ushinohama ......... G06F 3/1224

FOREIGN PATENT DOCUMENTS

JP 6531817 B2 6/2019

\* cited by examiner

*Primary Examiner* — Darryl V Dottin
(74) *Attorney, Agent, or Firm* — Venable LLP

(57) ABSTRACT

An information processing system, comprising an image printing apparatus, relay servers for managing status information of the image printing apparatus, management servers each registering service information in the corresponding relay server, and a database server storing information from the management servers, wherein each management server receives a connection notification including identification information of the image printing apparatus from the corresponding relay server, instructs the database server to store the corresponding relay server in association with the image printing apparatus, and transmits service registration information to the relay server when service registration is received from a service provider server that provides a service based on the status information.

9 Claims, 8 Drawing Sheets

FIG. 7A 701

| PRINTER | CONNECTION DESTINATION PRINTER MANAGEMENT SERVER |
|---------|---------------------------------------------------|
| PR0001  | PRINTER MANAGEMENT SERVER 103                     |

FIG. 7B 702

| PRINTER | SERVICE  |
|---------|----------|
| PR0001  | ServiceA |

FIG. 8 800 service.co.jp

801

REGISTER IN SERVICE A !

804

REGISTRATION PRINTER PR0001

803

☐ AGREE USE PERMISSION OF SERVICE A.

802

[ REGISTER ]

FOR SERVICE PROVISION FOR PRINTER,
TRANSMIT PRODUCT INFORMATION VIA INTERNET.
PLEASE SELECT WHETHER TO PERMIT TRANSMISSION.

| 901 | 902 |
|---|---|
| AGREE | DISAGREE |

FIG. 10  1001

| PRINTER | CONNECTION DESTINATION PRINTER MANAGEMENT SERVER |
|---|---|
| PR0001 | PRINTER MANAGEMENT SERVER 104 |

INFORMATION PROCESSING SYSTEM, CONTROL METHOD THEREFOR, AND COMPUTER-READABLE STORAGE MEDIUM

BACKGROUND OF THE INVENTION

Field of the Invention

The present invention mainly relates to an information processing system.

Description of the Related Art

In some of services using a network such as the Internet, an image printing apparatus detects the remaining amount state of a consumable item in itself, and orders the consumable item if the remaining amount of the consumable item is equal to or smaller than a predetermined amount (see Japanese Patent No. 6531817). In such service, the image printing apparatus is connected to a relay server to transmit consumable item information. A service provider server that provides the service registers, in the relay server, the identification information of the image printing apparatus that acquires consumable item information, and the relay server provides the consumable item information to the service provider server.

According to Japanese Patent No. 6531817, if the image printing apparatus is connected to another relay server, it can be difficult to specify a relay server in which the service provider server registers the image printing apparatus, there is room for improvement of usability in the service.

SUMMARY OF THE INVENTION

The present invention has been made in consideration of the above-described problem, and provides a technique advantageous in improving usability of an image printing apparatus in a predetermined service.

One of the aspects of the present invention provides an information processing system, comprising: an image printing apparatus; a plurality of relay servers each configured to manage status information to be transmitted from the image printing apparatus via a network; a plurality of management servers corresponding to the plurality of relay servers and each configured to register service information in the corresponding relay server; and a database server configured to store information from the plurality of management servers, wherein each of the plurality management servers includes a reception unit configured to receive a connection notification including identification information of the image printing apparatus from the corresponding relay server; a storage instruction unit configured to instruct, in a case where the connection notification is received, the database server to store the corresponding relay server in association with the image printing apparatus, and a transmission unit configured to transmit, in a case where service registration is received from a service provider server configured to provide a service based on the status information, service registration information to the relay server stored in association with the image printing apparatus in the database server.

Further features of the present invention will become apparent from the following description of exemplary embodiments (with reference to the attached drawings).

BRIEF DESCRIPTION OF THE DRAWINGS

FIGS. 7A and 7B are tables showing examples of a connection destination management table and a service management table, respectively;

FIG. 8 is a view showing an example of a service registration screen;

FIG. 9 is a view showing an example of a printer information transmission setting screen; and FIG. 10 is a table showing an example of a connection destination management table.

DESCRIPTION OF THE EMBODIMENTS

Figure 1:
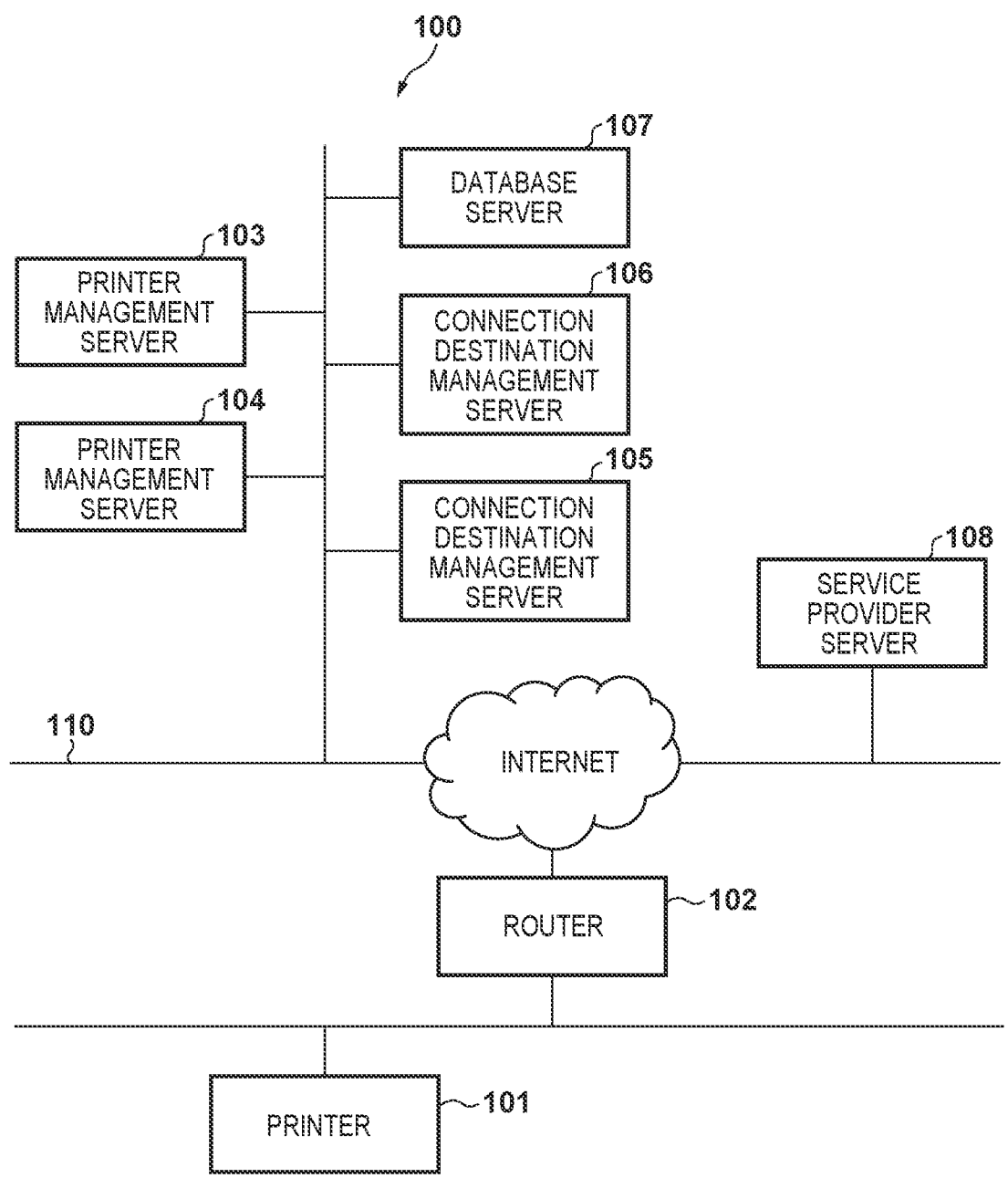
FIG. 1 is a view showing an example of the configuration of an information processing system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Configuration of Information Processing System>

FIG. 1 shows an example of the configuration of an information processing system according to an embodiment. An information processing system 100 includes printer management servers 103 and 104, connection destination management servers 105 and 106, a database server 107, a service provider server 108, and a printer 101 as an image printing apparatus.

The printer management servers 103 and 104, the connection destination management servers 105 and 106, the database server 107, and the service provider server 108 are connected to the Internet 110. The printer 101 is connectable to the Internet 110 via a router 102.

The printer management server 103 can transmit/receive information to/from the connection destination management server 105 via the Internet 110. The printer management server 104 can transmit/receive information to/from the connection destination management server 106 via the Internet 110. Each of the connection destination management servers 105 and 106 can execute read and write of information from/to the database server 107 via the Internet 110.

The number of printer management servers 103 and 104 is two in this example but may be three or more as long as a plurality (two or more) of printer management servers are provided. The same applies to the connection destination management servers 105 and 106. Although details will be described later, in this embodiment, even if the printer 101 is connected to any of the plurality of printer management servers, it is possible to register, from the service provider server 108, a service in the printer management server connected to the printer 101.

The plurality of printer management servers 103 and 104 can be arranged in different regions (for example, countries, states, prefectures, cities, or the like). Each of the plurality of printer management servers 103 and 104 may be expressed as a relay server, a relay apparatus, or the like. Similarly, the plurality of connection destination management servers 105 and 106 can be arranged in different regions. If the plurality of relay servers are arranged in different regions, the corresponding management servers are preferably arranged in the same or corresponding regions, respectively. Each of the plurality of connection destination management servers 105 and 106 may be expressed as a management server, a management apparatus, or the like.

Note that a known protocol is used for transmission/reception or communication, and Hypertext Transfer Protocol (HTTP), Message Queuing Telemetry Transport (MQTT), or the like can be used. The same applies to transmission/reception or communication of the printer 101.

The service provider server 108 can communicate with the connection destination management servers 105 and 106 via the Internet 110. This embodiment assumes that the service provider server 108 can provide various kinds of services. Examples of the services are delivery of a consumable item to the address of the user, and assignment of points corresponding to the number of times of execution of printing by the user. For example, the printer 101 periodically transmits, to the printer management servers 103 and 104, status information including information of the number of copies, the remaining ink amount, and the like together with the identification information (for example, the serial number) of the printer 101. Each of the printer management servers 103 and 104 transmits the information received from the printer 101 to the service provider server 108 in accordance with a service to which the printer 101 subscribes.

<Arrangement of Server>

Figure 2:
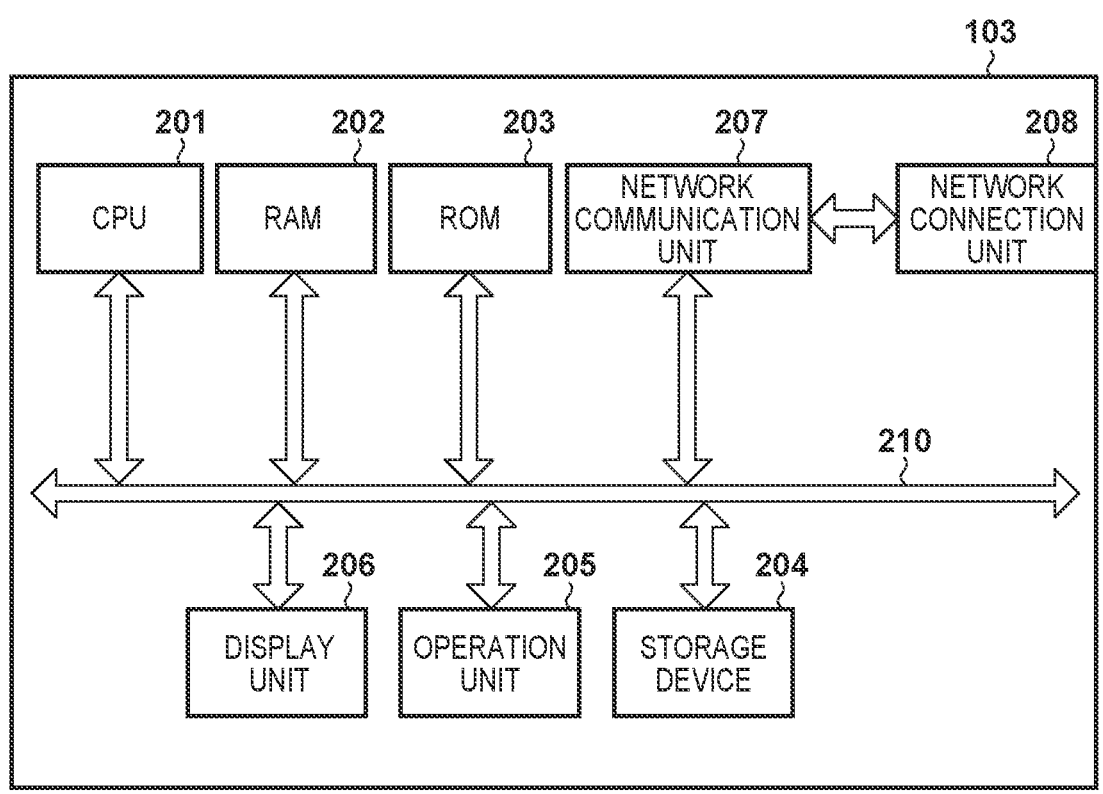
FIG. 2 is a block diagram showing an example of the hardware arrangement of a printer management server.

FIG. 2 is a block diagram showing an example of the hardware arrangement of the printer management server 103. The printer management server 103 includes a CPU 201, a RAM 202, a ROM 203, a storage device 204, an operation unit 205, a display unit 206, a network communication unit 207, and a network connection unit 208.

The Central Processing Unit (CPU) 201 controls each element of the printer management server 103. The Random Access Memory (RAM) 202 is used by the CPU 201 to execute a program. The Read Only Memory (ROM) 203 stores a boot program necessary to activate the system. The storage device 204 stores the program to be executed by the CPU 201, parameters, or information, and a nonvolatile memory such as a magnetic disk or a flash memory is used as the storage device 204. A known device that can accept an operation input from the user, such as a keyboard and a mouse, can be used as the operation unit 205. For example, a liquid crystal display or the like is used as the display unit 206, on which corresponding information can be displayed and presented to the user. The network communication unit 207 can be connected to the Internet 110 via the network connection unit 208 to implement communication with another element. These elements are connected to each other via a bus 210, thereby making it possible to transmit/receive data.

Assume that the printer management server 104, the connection destination management servers 105 and 106, the database server 107, and the service provider server 108 have the same hardware arrangement as that of the printer management server 103 and a description thereof will be omitted. Note that as another embodiment, each of these servers may have a hardware arrangement different from that of the printer management server 103. Note that each of the above-described servers may be a server system formed by one or a plurality of servers. For example, a plurality of servers may operate in cooperation with each other to function as one printer management server, one connection destination management server, one database server, and one service provider server.

<Hardware Arrangement of Printer>

Figure 3:
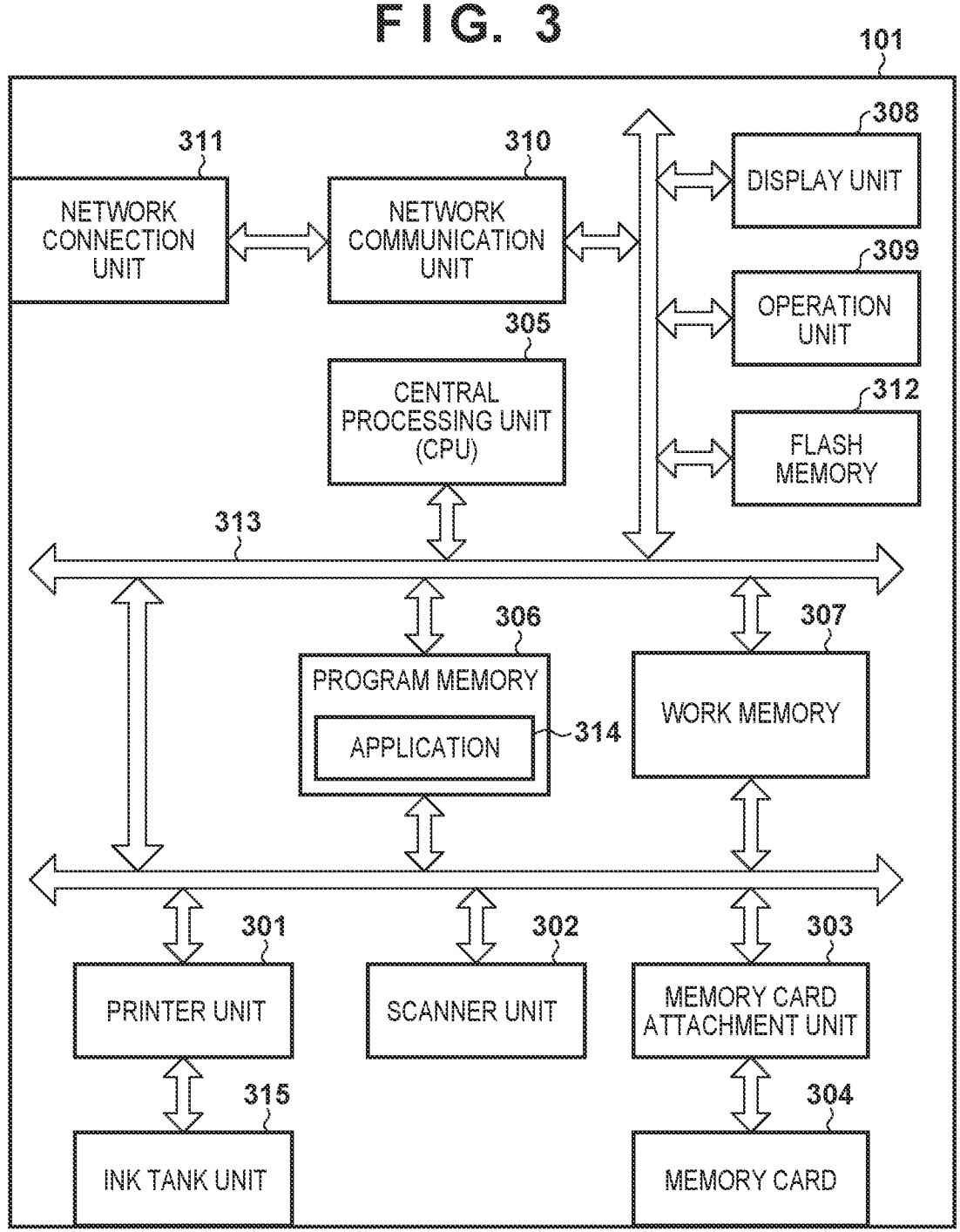
FIG. 3 is a block diagram showing an example of the hardware arrangement of a printer.

FIG. 3 is a block diagram showing an example of the hardware arrangement of the printer 101. The printer 101 includes a printer unit 301, a scanner unit 302, a memory card attachment unit 303, a memory card 304, and an ink tank unit 315. Furthermore, the printer 101 includes a CPU 305, a program memory 306, a work memory 307, a display unit 308, an operation unit 309, a network communication unit 310, a network connection unit 311, and a flash memory 312.

The printer 101 prints an image by the inkjet method but another method such as an electrophotographic method may be adopted as a printing method. In this example, the printer 101 as a Multi Function Peripheral is exemplified as an example of the image printing apparatus but the image printing apparatus is not limited to a printer. For example, a copying machine, a facsimile apparatus, or the like may be used as the image printing apparatus, or a device having no scanner function may be used.

In the printer 101, a printing function is implemented by the printer unit 301, a scanner function is implemented by the scanner unit 302, and a storage function is implemented by the memory card attachment unit 303 and the memory card 304.

The printer unit 301 records (or prints) an image on a print medium such as a print sheet by the inkjet method based on externally received image data, image data stored in the memory card 304, or the like. Furthermore, the printer unit 301 can manage ink information including remaining ink amount information and sheet information including information of the number of stacked sheets.

The scanner unit 302 converts, into a predetermined file format, electronic data obtained by optically reading a document placed on a document table (not shown), and transmits the thus obtained image data to an external apparatus via a network or stores the image data in a storage area (not shown) such as an HDD. If a copy function is used, image data obtained by reading, by the scanner unit 302, a document placed on the document table is transferred to the printer unit 301, and the printer unit 301 prints the image on a print medium based on the image data.

The memory card 304 attached to the memory card attachment unit 303 stores desired file data. The file data may be read out from an external apparatus via the network and edited. The file data can be stored in the memory card 304 in accordance with an instruction from an external apparatus.

The CPU 305 controls each element of the printer 101. The program memory 306 is formed by a ROM or the like, and can store various program codes, an application 314 for communicating with the printer management server 103, and the like. The work memory 307 is formed by a RAM or the like, and temporarily stores image data and the like at the time of execution of a service or is used to perform buffering. A liquid crystal display or the like is used as the display unit 308, on which information corresponding to the above-described function can be displayed. Buttons and the like are used as the operation unit 309 to be able to accept an operation input by the user. The network communication unit 310 is connected to the router 102 via the network connection unit 311, thereby connecting the printer 101 to the Internet 110. The flash memory 312 stores image data received by the network communication unit 310 and the like. These elements are connected to each other via a bus 313, thereby making it possible to transmit/receive data.

<Printer Information Transmission Setting Screen>

FIG. 9 shows an example of a setting screen 900 displayed on the display unit 308 of the printer 101. The setting screen 900 includes an agreement button 901 for selecting "agree", and a disagreement button 902 for selecting "disagree". If the user presses the agreement button 901, a printer information transmission setting is enabled. The printer information transmission setting indicates a setting for externally transmitting, from the printer 101, printer information including status information (for example, information indicating the number of copies, the remaining ink amount, and the like) of the printer 101 and print information necessary to execute printing, periodically or in response to satisfaction of a predetermined condition. The setting screen 900 may be expressed as the printer information transmission setting screen 900, the information transmission setting screen 900, or the like.

Example 1

<Processing of Registering Service after Connecting Printer to Printer Management Server>

Figure 4:
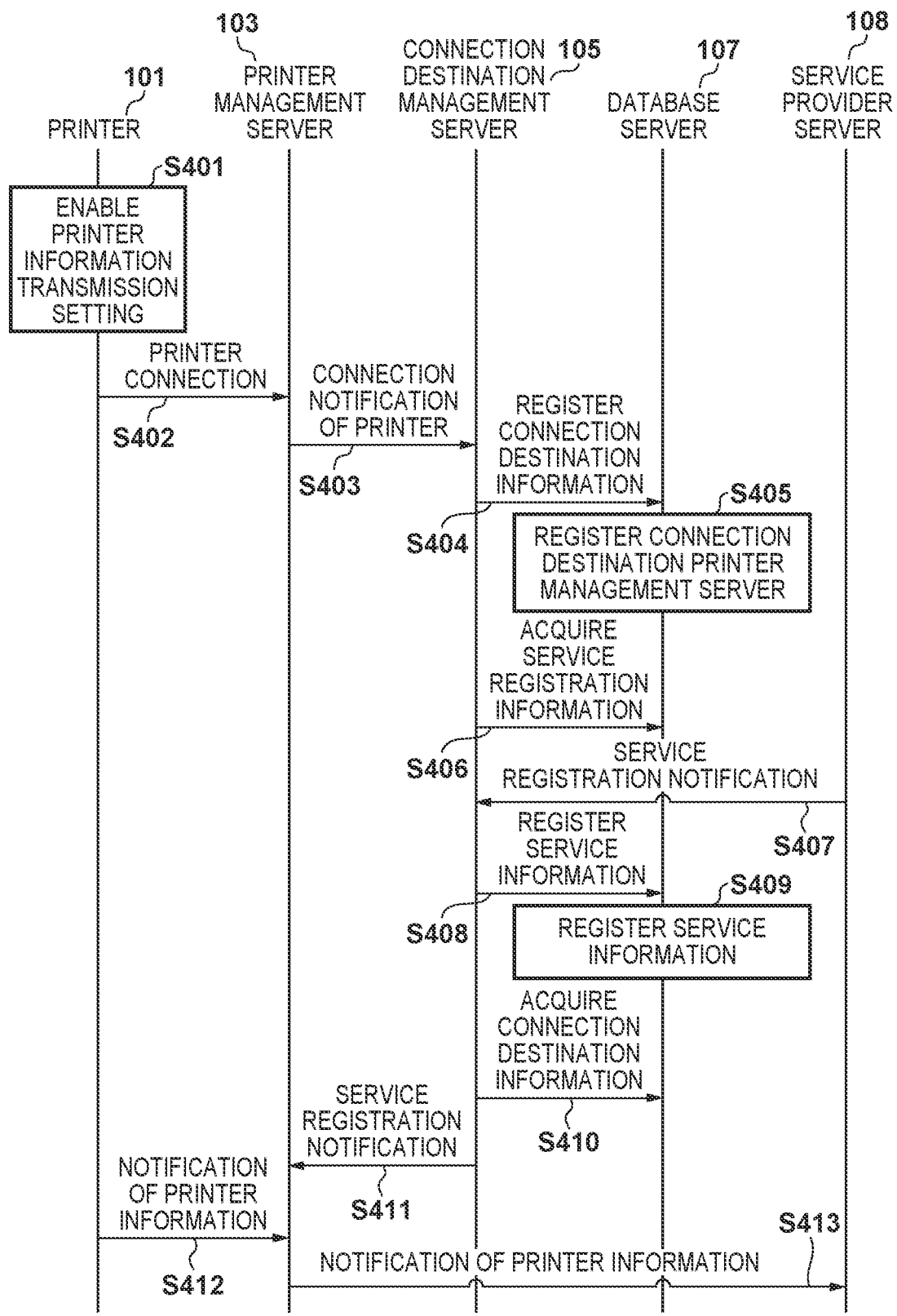
FIG. 4 is a sequence chart showing a mode of transmitting/receiving information or data in the information processing system.

FIG. 4 is a sequence chart showing an example of a series of processes executed after a printer 101 is connected to a printer management server 103 until a service provider server 108 receives the printer information of the printer 101.

The series of processes can be executed by the CPUs of the printer 101, the printer management server 103, a connection destination management server 105, a database server 107, and the service provider server 108. That is, the series of processes can be performed when each CPU deploys the program codes stored in the storage device into the RAM and executes them. Alternatively, some or all of the steps shown in FIG. 4 may be implemented by an electronic circuit such as an ASIC or hardware.

In step S401 (to be simply referred to as "S401" hereinafter) (the same applies to other steps to be described later), the printer 101 detects that the user enables the printer information transmission setting in the setting screen 900.

In S402, the printer 101 sends a printer connection notification to the printer management server 103, thereby making a notification of printer identification information of the printer 101. The printer identification information may include both the serial number and the MAC address of the printer 101 but may include one of them or may include other information that can identify the printer 101. Note that the printer connection notification may simply be expressed as the connection notification.

In S403, the printer management server 103 sends a printer connection notification to the connection destination management server 105, thereby making a notification of the printer identification information of the printer 101.

In S404, the connection destination management server 105 sends, to the database server 107, a connection destination registration instruction to store the printer 101 and the printer management server 103 in association with each other.

In S405, the database server 107 registers the printer 101 and the printer management server 103 in association with each other in a connection destination management table 701 in the database. This registration can be referred to as connection destination printer management server registration.

FIGS. 7A and 7B show examples of the connection destination management table 701 and a service management table 702 stored in the database of the database server 107, respectively. Upon receiving the connection destination registration instruction from the connection destination management server 105, the database server 107 registers, in the connection destination management table 701 shown in FIG. 7A, the printer identification information and information of the printer management server 103 connected to the printer 101 in association with each other. Furthermore, upon receiving a service information registration instruction from the connection destination management server 105, the database server 107 registers the printer identification information and a service name in association with each other in the service management table 702 shown in FIG. 7B. Details will be described later.

Referring back to FIG. 4, in S406, the connection destination management server 105 acquires service registration information of the printer 101 from the service management table 702. Note that since service registration has not been performed from the service provider server 108 with respect to the printer 101 at this time, processing using confirmation of service registration as a trigger is not performed.

FIG. 8 shows an example of a registration screen 800 as a screen used by the user to register the printer 101 in a Web service. The registration screen 800 includes a display field 804 of printer identification information to be registered, a use permission checkbox 803, and a registration button 802. The registration screen 800 may be expressed as the service registration screen 800, the Web service registration screen 800, or the like.

Referring back to FIG. 4, after S406, the user turns on the checkbox 803 of the registration screen 800 and presses the registration button 802. In response to this, in S407, the service provider server 108 sends a service registration notification to the connection destination management server 105, thereby making a notification of the Web service name and the printer identification information of the printer 101.

In S408, the connection destination management server 105 sends, to the database server 107, a service registration instruction to store the printer identification information and the Web service name in association with each other.

In S409, the database server 107 registers the printer 101 and the Web service name in association with each other in the service management table 702 in the database of the database server 107.

In S410, the connection destination management server 105 acquires, from the connection destination management table 701, the connection destination information of the printer management server 103 connected to the printer 101.

In S411, the connection destination management server 105 sends a service registration notification to the printer management server 103 connected to the printer 101, thereby making a notification of the Web service name and the printer identification information of the printer 101. Note that after that, the printer management server 103 can notify the service provider server 108 of the printer information from the printer 101.

In S412, the printer 101 notifies the printer management server 103 of the printer information such as the printer identification information and the status information (for example, information indicating the number of copies, the remaining ink amount, and the like) of the printer 101.

In S413, the printer management server 103 notifies the service provider server 108 of the printer information such as the printer identification information and the status information of the printer 101.

Note that above sequence is also the same in a case where the printer 101 is connected to a printer management server 104 instead of the printer management server 103.

According to this example, even if the printer 101 is connected to any (for example, 103) of the plurality of printer management servers, the service provider server 108 can execute service registration in the printer management server 103 connected to the printer 101. This enables the service provider server 108 to receive the printer information of the printer 101. Therefore, according to this example, the usability of the printer 101 when providing various services for the printer 101 can be improved.

Note that the mode of recording information in the database server 107 connected via the Internet 110 has been exemplified. However, the contents of the embodiment are not limited to the exemplified mode and an arrangement in which connection is executed by a local network may be adopted. The connection destination management server 105 and/or 106 may be a printing apparatus having a storage function capable of acquiring and recording information.

Example 2

Example 1 has exemplified the mode in which after the printer 101 is connected to the printer management server 103, the service provider server 108 registers the printer 101. To the contrary, in Example 2, before a printer 101 is connected to a printer management server 103, a service provider server 108 can register the printer 101.

<Processing of Registering Service Before Connecting Printer to Printer Management Server>

Figure 5:
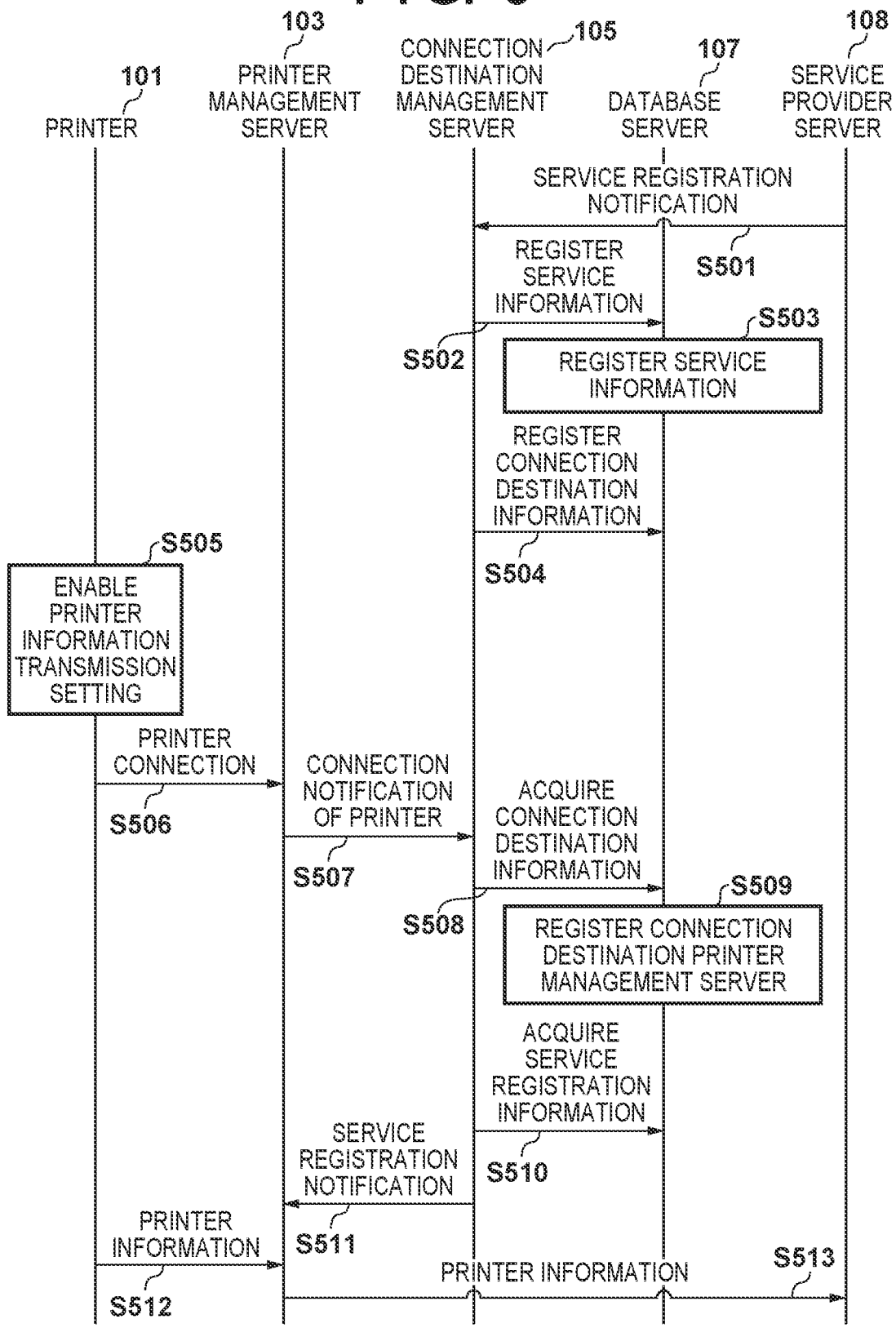
FIG. 5 is a sequence chart showing a mode of transmitting/receiving information or data in the information processing system.

FIG. 5 shows a series of processes from when the service provider server 108 registers the printer 101 before connecting the printer 101 to the printer management server 103 until the service provider server 108 receives printer information, similar to FIG. 4. The series of processes can be executed by the CPUs of the printer 101, the printer management server 103, a connection destination management server 105, a database server 107, and the service provider server 108, similar to FIG. 4.

Contents in S501 to S503 are the similar to those in S407 to S409 of FIG. 4 (see Example 1).

In S504, the connection destination management server 105 acquires, from a connection destination management table 701, connection destination information of the printer management server 103 connected to the printer 101. Note that since the printer 101 cannot be connected to the printer management server 103 at this time, processing using, as a trigger, confirmation of the printer management server 103 as a connection destination is not performed.

Contents in S505 to S509 are similar to those in S401 to S405 of FIG. 4 (see Example 1).

In S510, the connection destination management server 105 acquires service registration information of the printer 101 from a service management table 702.

Contents in S511 to S513 are similar to those in S411 to S413 of FIG. 4 (see Example 1).

According to this example, even if the service provider server 108 executes service registration before the printer 101 is connected to the printer management server 103, the service provider server 108 can receive the printer information of the printer 101.

Example 3

Example 3 shows an example in a case where a service provider server 108 registers a printer 101 and can receive printer information of the printer 101 from a printer management server 103, and then the connection destination of the printer 101 is updated to a printer management server 104.

FIG. 5 shows a series of processes from when the service provider server 108 registers the printer 101 before connecting the printer 101 to the printer management server 103 until the service provider server 108 receives the printer information, similar to FIG. 4. The series of processes can be executed by the CPUs of the printer 101, the printer management server 103, a connection destination management server 105, a database server 107, and the service provider server 108, similar to FIG. 4.

Figure 6:
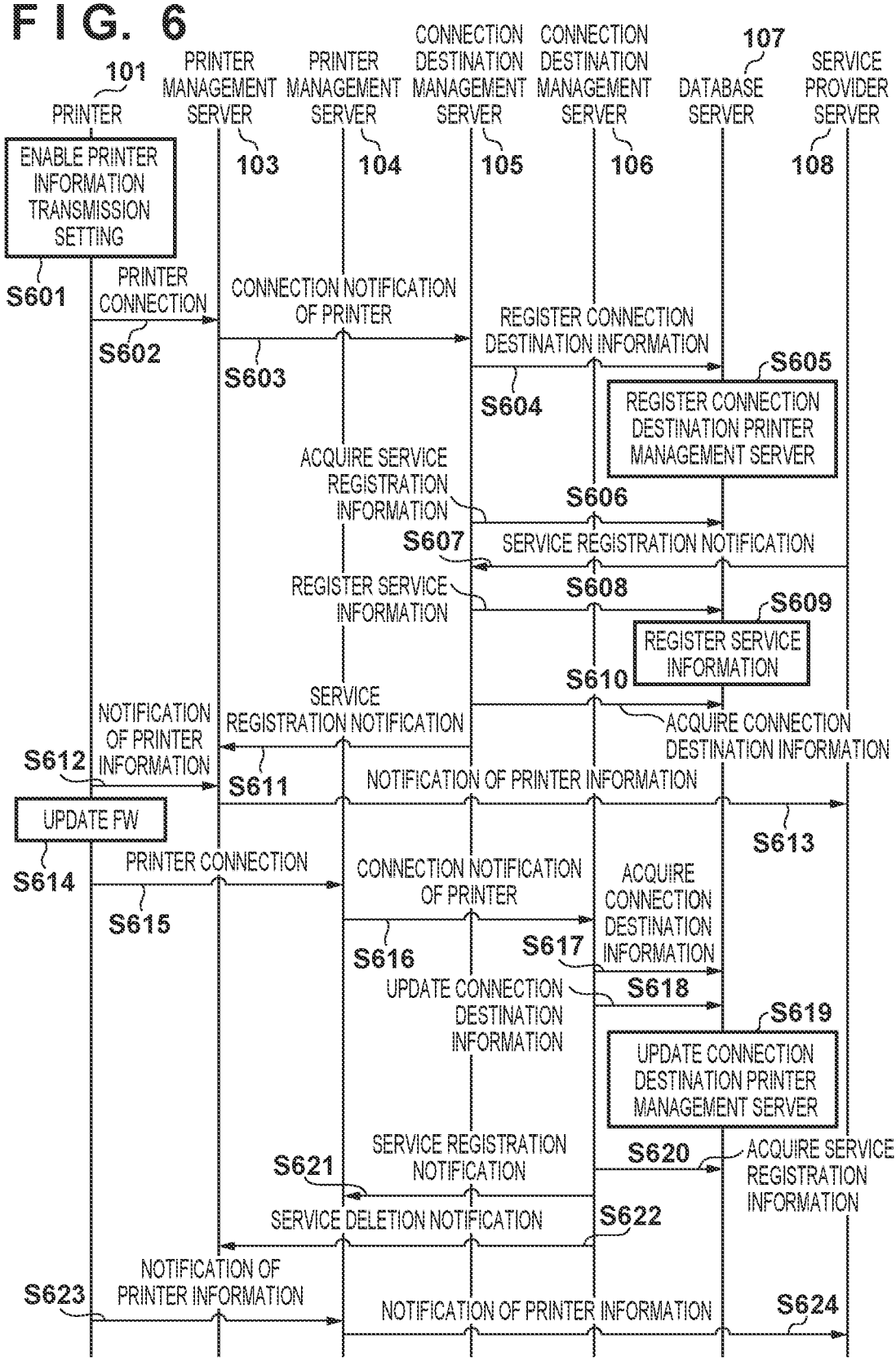
FIG. 6 is a sequence chart showing a mode of transmitting/receiving information or data in the information processing system.

FIG. 6 shows a series of processes in a case where the printer 101 changes its connection destination from the printer management server 103 to the printer management server 104, and the service provider server 108 receives the printer information of the printer 101 from the printer management server 104, similar to FIGS. 4 and 5. The series of processes can be executed by the CPUs of the printer 101, the printer management servers 103 and 104, the connection destination management server 105, a connection destination management server 106, the database server 107, and the service provider server 108, similar to FIG. 4.

Contents in S601 to S613 are similar to those in S401 to S413 of FIG. 4 (see Example 1).

In S614, the printer 101 updates firmware. The firmware is updated by the printer 101 using a known method. For example, if the latest firmware of the printer 101 exists on a firmware distribution server, information indicating that there exists the update version of the firmware can be displayed on a display unit 308. The user performs an operation input on an operation unit 309 in response to the display, thereby executing update.

In S615, upon completion of the update of the firmware, the printer 101 sends a printer connection notification to the printer management server 104, thereby making a notification of printer identification information of the printer 101.

In S616, the printer management server 104 sends a printer connection notification to the connection destination management server 106, thereby making a notification of the printer identification information of the printer 101.

In S617, the connection destination management server 106 acquires, from a connection destination management table 701, the connection destination information of the printer management server 104 connected to the printer 101.

In S618, the connection destination management server 106 sends, to the database server 107, a connection destination update instruction to store the printer 101 and the printer management server 104 in association with each other.

In S619, the database server 107 changes or updates the connection destination management table 701 that stores the printer 101 and the printer management server 103 in association with each other to a connection destination management table 1001 that stores the printer 101 and the printer management server 104 in association with each other.

FIG. 10 shows an example of the connection destination management table 1001 stored in the database of the database server 107. Upon receiving a connection destination update instruction from the connection destination management server 105 or 106, the database server 107 updates the information of the printer management server 103 or 104 associated with the printer 101.

Referring back to FIG. 6, in S620, the connection destination management server 106 acquires the service registration information of the printer 101 from a service management table 702.

In S621, the connection destination management server 106 sends a service registration notification to the printer management server 104, thereby making a notification of a Web service name and the printer identification information of the printer 101.

In S622, the connection destination management server 106 sends a service deletion notification to the printer management server 103 acquired in S617, thereby making a notification of deletion of the Web service name and the printer identification information of the printer 101.

Contents in S623 and S624 are similar to those in S412 and S413 of FIG. 4 (see Example 1).

In this example, after the printer 101 is connected to the printer management server 103 and service registration from the service provider server 108 is completed, the connection destination of the printer 101 is changed to the printer management server 104. According to this example, in this case as well, the service provider server 108 can receive the printer information from the printer management server 104.

In this example, the connection destination of the printer 101 is changed from the printer management server 103 to the printer management server 104 by updating the firmware but the connection destination of the printer 101 may be updated by another known method. For example, the printer management server 103 may transmit a connection destination update instruction to the printer 101, and the printer 101 may change, in response to this, the connection destination to the printer management server 104. Alternatively, the printer 101 may detect a change of the installation location of the printer 101 and, in response to this, update the connection destination.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

(Others)

In the above explanation, to facilitate understanding, each element is denoted using a name associated with its function. However, the elements are not limited to those having the contents described in the embodiment as their main functions, and may auxiliarily have the functions. Hence, the expression of each element is not strictly limited and can be replaced with a similar expression. For example, "server" may be expressed as "information management apparatus", "information processing apparatus", or the like. To the same effect, the expression "apparatus" may be replaced with "unit", "component or piece", "member", "structure", "assembly", or the like, or may be omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-087878, filed on May 30, 2022, which is hereby incorporated by reference herein in its entirety.

What is claimed is:

1. An information processing system comprising:
an image printing apparatus;
a plurality of relay servers each configured to manage status information to be transmitted from the image printing apparatus via a network;
a plurality of management servers corresponding to the plurality of relay servers and each configured to register service information in the corresponding relay server; and
a database server configured to store information from the plurality of management servers,
wherein each of the plurality management servers includes
at least one processor circuit with a memory storing instructions that, when executed by the at least one processor circuit, cause the at least one processor circuit to function as:
a receiving unit configured to receive a connection notification including identification information of the image printing apparatus from the corresponding relay server;
a storing instruction unit configured to instruct, in a case where the connection notification is received, the database server to store the corresponding relay server in association with the image printing apparatus, and
a transmitting unit configured to transmit, in a case where service registration request is received from a service provider server configured to provide a service based on the status information, service information to the relay server stored in association with the image printing apparatus in the database server.

2. The system according to claim 1, wherein in a case where the relay server connected to the image printing apparatus is changed, the receiving unit receives a connection notification from the changed relay server, and the storing instruction unit instructs the database server to store the changed relay server in association with the image printing apparatus.

3. The system according to claim 1, wherein the plurality of relay servers are arranged in different regions, and the corresponding management servers are arranged in the corresponding regions, respectively.

4. The system according to claim 1, wherein the image printing apparatus is a printer configured to execute printing by an inkjet method.

5. The system according to claim 4, wherein the service provided by the service provider server includes delivery of a consumable item of the image printing apparatus to an address of a user of the image printing apparatus.

6. The system according to claim 4, wherein the service provided by the service provider server includes assignment of points corresponding to the number of times of execution of printing in the image printing apparatus by a user of the image printing apparatus.

7. The system according to claim 1, wherein each of one relay server, one management server, and one service provider server is a server system formed by one or a plurality of servers.

8. A control method for an information processing system including
an image printing apparatus,
a plurality of relay servers each configured to manage status information to be transmitted from the image printing apparatus via a network,
a service provider server configured to provide a service based on the status information,
a plurality of management servers corresponding to the plurality of relay servers and each configured to register service information in the corresponding relay server, and
a database server configured to store information from the plurality of management servers,
the method comprising:
in each of the plurality management servers,
receiving a connection notification including identification information of the image printing apparatus from the corresponding relay server;
instructing, in a case where the connection notification is received, the database server to store the corresponding relay server in association with the image printing apparatus; and
transmitting, in a case where service registration request is received from a service provider server, service information to the relay server stored in association with the image printing apparatus in the database server.

9. A computer-readable storage medium storing a program, the program configured to cause a computer to execute each step of a control method defined in claim 8.

* * * * *